US007752766B2

(12) United States Patent
Ruck et al.

(10) Patent No.: US 7,752,766 B2
(45) Date of Patent: Jul. 13, 2010

(54) METHOD AND APPARATUS FOR DETERMINING SPATIAL COORDINATES AT A MULTIPLICITY OF MEASUREMENT POINTS

(75) Inventors: Otto Ruck, Ellwangen-Pfahlheim (DE); Eugen Aubele, Boekmenkirch (DE); Guenter Grupp, Boehmenkirch (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 12/465,705

(22) Filed: May 14, 2009

(65) Prior Publication Data

US 2009/0271997 A1   Nov. 5, 2009

Related U.S. Application Data

(63) Continuation of application No. PCT/EP2007/009797, filed on Nov. 13, 2007.

(30) Foreign Application Priority Data

Nov. 17, 2006   (DE) ................. 10 2006 055 005

(51) Int. Cl.
*G01B 5/004* (2006.01)
(52) U.S. Cl. ........................................ 33/503
(58) Field of Classification Search ............... 33/503, 33/556–561
See application file for complete search history.

(56) References Cited

U.S. PATENT DOCUMENTS

| 5,623,766 | A | 4/1997 | Ruck et al. |
| 5,862,604 | A * | 1/1999 | Fuchs et al. ............... 33/503 |
| 5,966,681 | A | 10/1999 | Bernhardt et al. |
| 6,158,136 | A * | 12/2000 | Gotz et al. ............... 33/503 |
| 2004/0245859 | A1 | 12/2004 | Sieber |
| 2008/0295349 | A1 * | 12/2008 | Uhl et al. ............... 33/503 |
| 2009/0307916 | A1 * | 12/2009 | McLean et al. ............ 33/503 |
| 2010/0011600 | A1 * | 1/2010 | Hunter et al. ............ 33/503 |

FOREIGN PATENT DOCUMENTS

| DE | 31 06 031 A1 | 12/1981 |
| DE | 44 24 225 A1 | 1/1996 |
| DE | 196 14 883 C2 | 10/1997 |
| DE | 201 14 750 U1 | 1/2003 |
| DE | 102 29 824 A1 | 1/2004 |
| DE | 102 57 856 A1 | 7/2004 |
| EP | 0 849 654 A2 | 6/1998 |
| EP | 0 974 882 A2 | 1/2000 |
| EP | 1 503 174 A1 | 2/2005 |

* cited by examiner

*Primary Examiner*—G. Bradley Bennett
(74) *Attorney, Agent, or Firm*—Harness Dickey & Pierce, P.L.C.

(57) ABSTRACT

In order to determine spatial coordinates of a multiplicity of measurement points along a contour of a measurement object, a probe head is provided with a probe element that is movably supported on the probe head. During movement of the probe head along the contour, position measuring values of the probe head and deflections of the probe element relative to the probe head are determined. Spatial coordinates for the measurement points along the contour are determined from the position measuring values and deflections. The probe element is kept in contact with the contour during movement of the probe head by using an actuator to produce a defined contact force. The contact force is set as a function of a differential acceleration of the probe element relative to the probe head.

18 Claims, 5 Drawing Sheets

METHOD AND APPARATUS FOR DETERMINING SPATIAL COORDINATES AT A MULTIPLICITY OF MEASUREMENT POINTS

CROSS REFERENCES TO RELATED APPLICATIONS

This application is a continuation of international patent application PCT/EP2007/009797 filed on Nov. 13, 2007 designating the U.S., which international patent application has been published in German language and claims priority from German patent application DE 10 2006 055 005.6 filed on Nov. 17, 2006. The entire contents of these prior applications are incorporated herein by reference.

BACKGROUND OF THE INVENTION

The invention relates to a method and an apparatus for determining spatial coordinates at a multiplicity of measurement points along a contour of a measurement object. In particular, the invention relates to a method and an apparatus for the continuous measurement (so-called scanning) of a surface of a measurement object by means of an active tactile probe head that enables the setting of a defined contact force (or sensing force) by means of a preliminary deflection.

The present invention is applied in the field of so-called coordinate measuring technology. This is understood as measuring workpieces in one, two and preferably even three dimensions by means of measuring tools that enable spatial coordinates to be determined at selected measurement points of the workpieces. A typical coordinate measuring machine has a head part that can be moved relative to the workpiece or measurement object. The head part carries a sensor by means of which the head part can be brought into an exactly defined position with reference to the measurement point. In tactile coordinate measuring machines, the measurement point is contacted by means of a probe element. The head part is therefore usually denoted as probe head in such cases. The probe element is generally a stylus whose free end terminates in a spherical tip. The stylus is movably supported on the probe head such that the stylus is deflected relative to the probe head during contacting. Given a specific deflection and/or contact force, position measuring values are recorded that are representative of the position of the probe head in the measuring volume, and thus of the position of the probe head relative to the measurement object. Moreover, in the case of so-called measuring probe heads the deflection of the stylus relative to the probe head is determined. Spatial coordinates for the contacted measurement point can then be determined from the position measuring values for the probe head and the deflections of the stylus. By contacting a plurality of surface points on a workpiece, it is also possible to detect geometric dimensions and shape profiles, the latter being possible with particular effectiveness by using a continuous (scanning) recording of measurement values.

In the case of probe heads for tactile coordinate measuring machines, one can distinguish between active and passive probe heads. In the case of passive probe heads, the rest position of the probe element is set solely by means of mechanical springs. A deflection from the rest position takes place only during contacting of a measurement point against the spring force. By contrast, active probe heads have one or more actuators configured to deflect the probe element in a defined way before contact with the measurement object takes place, or without contact taking place. Such active probe heads are particularly suitable for scanning measurements, because the actuator can be used for keeping the probe element in continuous contact with the surface of the measurement object.

However, the invention is not limited to coordinate measuring machines in the narrower sense. It can, for example, also be used on machine tools or other machines in the case of which a workpiece surface is scanned with a tactile probe element.

Even in the case of active probe heads, the probe element is supported on the probe head by means of spring elements in order to enable the deflection about the rest position. In the case of active and passive probe heads, the support by means of spring elements renders it possible for the probe element to get into mechanical oscillations because of the movements of the probe head and because of the contacting actions.

SUMMARY OF THE INVENTION

Against this background, it is an object of the present invention to provide a method and a device of the type mentioned at the beginning, wherein oscillations of the probe element are effectively reduced. It is another object to provide a method and a device which are particularly suitable for scanning a workpiece surface in a tactile manner.

According to a first aspect of the invention, there is provided a method for determining spatial coordinates at a multiplicity of measurement points along a contour of a measurement object, the method comprising the steps of providing a probe head comprising a probe element movably supported on the probe head and comprising an actuator capable of setting a preliminary deflection of the probe element relative to the probe head, moving the probe head relative to the measurement object in a measuring volume, contacting a first measurement point on the contour with the probe element, recording first position values and first deflections, the first position values being representative of the position of the probe head in the measuring volume, and the first deflections being representative of the position of the probe element relative to the probe head, moving the probe head along the contour and recording further position values and further deflections at the multiplicity of measurement points along the contour, and determining the spatial coordinates as a function of the further position values and the further deflections, wherein the probe element is held in contact with the contour during the step of moving the probe head by producing a defined contact force by means of the actuator, and wherein the defined contact force is determined as a function of a differential acceleration of the probe element relative to the probe head and, furthermore, as a function of a differential speed of the probe element relative to the probe head According to another aspect of the invention, there is provided an apparatus for determining spatial coordinates at a multiplicity of measurement points along a contour of a measurement object, the apparatus comprising a probe head comprising a probe head base, a probe element movably supported relative to the probe head base, and comprising an actuator capable of setting a preliminary deflection of the probe element relative to the probe head base, the probe head being movable relative to the measurement object in a measuring volume, first position measuring devices for determining position values that are representative of the position of the probe head in the measuring volume, second position measuring devices for determining deflections that are representative of the position of the probe element relative to the probe head base, an evaluation and control unit for determining the spatial coordinates as a function of the position values and the deflections, and a control device configured to hold the probe element in contact with the contour during movement of the probe head by producing a defined contact force by means of the actuator, wherein the control device is designed to determine the defined contact force as a function of a differential acceleration of the probe element relative to the probe head base and, preferably, also as a function of a differential speed of the probe element relative to the probe head base.

According to yet another aspect, there is provided a method for determining spatial coordinates of a multiplicity of measurement points in a measurement volume, the method comprising the steps of providing a probe head comprising a probe element movably supported on the probe head and an actuator capable of producing a defined contact force when the probe element makes contact with the measurement object, contacting a first measurement point on the measurement object with the probe element, moving the probe head along a contour on the measurement object, recording position values and deflections, with the position values being representative of the positions of the probe head within the measuring volume, and with the deflections being representative of the positions of the probe element relative to the probe head, determining the spatial coordinates as a function of the position values and the deflections, wherein the probe element is held in contact with the measurement object along the contour during the step of moving by producing the defined contact force by means of the actuator, and wherein the defined contact force is determined as a function of a differential acceleration of the probe element relative to the probe head.

In preferred embodiments, the new method is implemented by means of a computer program comprising program code designed to execute such a method when the program code is executed in the control unit of such an apparatus. Such computer program renders it possible to easily retrofit embodiments of the new method in older existing coordinate measuring machines.

The new methods and apparatus are based on the idea of using an acceleration of the probe element relative to the probe head in order to obtain a signal that is in phase opposition to the potential oscillations of the probe element and can be used to compensate the oscillations. The acceleration of the probe element relative to the probe head is a differential acceleration, since the acceleration of the probe head itself is less suitable for effective damping of the disturbing oscillations. By contrast, very good results can be achieved by means of the differential acceleration of the probe element relative to the probe head, because the oscillations to be suppressed result in an approximately sinusoidal position profile of the probe element relative to the probe head. Since the acceleration corresponds to a twofold differentiation of this position profile, the profile of the differential acceleration is likewise sinusoidal, although phase shifted by 180°. The differential acceleration of the probe element relative to the probe head therefore provides a signal that is well suited as a correction signal of opposite phase by means of which the oscillations of the probe element can be compensated for.

The new methods and apparatus can be implemented very easily and cost-effectively in the case of systems that use active measuring probe heads with an adjustable preliminary deflection. In the ideal case, there is no need for any conversion measures on the hardware.

Moreover, it has emerged in practical tests that the undesired oscillations of the probe element can be very effectively suppressed with the new approach. This is advantageous in the case of measurements in which the contour of a measuring object is continuously measured or scanned. A higher measuring accuracy can be achieved on the basis of the reduced oscillations.

In a refinement, the differential acceleration of the probe element is measured with at least one acceleration sensor. It is possible to use at least two acceleration sensors of which one is coupled to the movable probe element, while another is coupled to a probe head base that is fixed (relative thereto).

The detection of the differential acceleration by measurement facilitates an effective suppression of the undesired oscillations in cases where the computing power of the evaluation and control unit is limited such that it is difficult to implement real time suppression. The use of two separate acceleration sensors on, or in connection with the probe element and the probe head base enables a particularly simple and rapid detection of the differential acceleration.

In another refinement, the differential acceleration of the probe element is estimated with at least one state observer.

A state observer includes a simulation on the basis of a mathematical model that describes the behavior of the probe element relative to the probe head. The state observer can be implemented by means of software and/or by means of hardware. It receives the same input variables that are also used to control the probe element and to set the contact force. Moreover, the state observer receives the output variables with which the actual position of the probe element is detected. Consequently, the state observer can simulate the behavior of the probe element, and it is then possible to estimate from the model further state variables such as, for example, the acceleration of the probe element. The use of a state observer enables the determination of the (differential) acceleration of the probe element without the need for corresponding acceleration sensors. This is advantageous because commercial acceleration sensors such as, for example, are used to trigger airbags in motor vehicles, respond only given relatively strong accelerations. The accelerations of the probe element that occur in the present case are, however, relatively slight, and this renders detection by measurement technique difficult. The usage of a state observer avoids these difficulties. However, the use of a state observer has the disadvantage that external disturbance variables such as, for example, strong oscillations of the underlying ground on which the coordinate measuring machine stands, cannot be detected in real time, or can be detected only with great difficulty. For this reason, it can be advantageous to combine acceleration sensors and a state observer.

In another refinement, the acceleration of the probe element is determined differentially from the deflections of the probe element relative to the probe head.

This refinement is currently viewed with particular preference, because active measuring probe heads usually have one or more position measuring devices that enable the deflections of the probe element relative to the probe head to be determined. The "start value" required for this refinement is therefore available. A twofold differentiation yields the differential acceleration of the probe element relative to the probe head, account being taken of any external disturbance variables. Moreover, this refinement can be used for a multiplicity of various probe heads and stylus combinations, because the refinement is independent of the parameters of the probe head. This is particularly advantageous because the probe heads of coordinate measuring machines are frequently fitted with variable stylus arrangements, and so the behavior of the probe element varies dependent to the respective assembly.

In another refinement, the contact force is further determined against a speed of the probe element relative to the probe head.

It has emerged that this refinement yields good results in combination with the acceleration-dependent damping. This holds chiefly when the acceleration of the probe element is determined from the deflections of the probe element by means of twofold differentiation, because the speed of the probe element is then available in any case as an intermediate result. Moreover, the acceleration signal obtained by twofold differentiation can include strong interference components based on noise. A speed-dependent damping enables efficient suppression of the undesired oscillations, chiefly in the cases where strong interferences are present in the acceleration signal.

In another refinement, the defined contact force is determined periodically as a function of the differential acceleration.

This refinement is advantageous because it facilitates cost-effective digital implementation by software and can be integrated easily into existing control algorithms.

In another refinement, the differential acceleration of the probe element is filtered in order to obtain a filtered differential acceleration, wherein the defined contact force is determined as a function of the filtered differential acceleration.

This refinement is advantageous because interference signals present in the acceleration signal have a particularly strong effect, the result being to impair the suppression of the undesired oscillations. In real operating environments, an effective filtering of the acceleration signal is of great importance for the effective depression of the undesired oscillations.

In another refinement, the acceleration of the probe element is filtered by means of a non-recursive filter in order to obtain the filtered acceleration.

Non-recursive filters are frequently also denoted as FIR (finite impulse response) filters. These are usually digital filters in the case of which one or more past values of a signal (here, the acceleration signal) are provided with a weighting and added to the current value of the acceleration signal. This provides a type of averaging from the current and past signal values that has proved to be particularly effective for suppressing the undesired oscillations.

In another refinement, the non-recursive filter has a largely rectangular weighting.

In this refinement, a number of past values are added to the respectively current acceleration value, all the added acceleration values being largely equally weighted. A sliding average is formed in this way. This refinement yields good results and has the advantage that it can be implemented with a low computational outlay. It is advantageous that such an FIR filter can be implemented without the required computing power being dependent on the filter width or the number of past values. Moreover, this type of FIR filter causes a relatively slight phase shift, and this is advantageous for suppressing the undesired oscillations.

In another refinement, the non-recursive filter has a largely triangular weighting.

In this refinement, the weighting is at least approximately inversely proportional to time. The further an acceleration value lies in the past, the less strongly it is weighted. In other words, the acceleration values are rated with a factor that is smaller the further back in time they lie relative to the current acceleration value. Such an FIR filter has a very slight phase shift and is therefore well suited for filtering the acceleration signal within the scope of the present invention. Such an FIR filter can advantageously likewise be implemented with an algorithm independent of the filter width by virtue of the fact that in each filter clock the current acceleration value is added with its associated weighting to the existing weighted sum of the past values and then the sum of the simply weighted values is subtracted.

In another refinement, the acceleration of the probe element is, furthermore, filtered with a recursive high-pass filter in order to obtain the filtered acceleration. The recursive high-pass filter is advantageously in series with the non-recursive filter. It is advantageous for the recursive high-pass filter to be downstream of the non-recursive filter.

Recursive filters are frequently also denoted as IIR (infinite impulse response) filters. These are digital filters in the case of which an output value of the filtered output signal is recursively subtracted from the current value of the acceleration signal to be filtered. A recursive filter can be dimensioned quiet simply with known methods such as, for example, the so-called bilinear transformation. The combination of an FIR filter and an IIR high-pass filter has yielded the best results in practical tests by the applicant.

It is to be understood that the features mentioned above and yet to be explained below may be used not only in the combination respectively indicated, but also in other combinations or separately, without departing from the scope of the present invention.

BRIEF DESCRIPTION OF THE DRAWINGS

Exemplary embodiments of the invention are represented in the drawing and will be explained in more detail in the following description.

DESCRIPTION OF PREFERRED EMBODIMENTS

Figure 1:
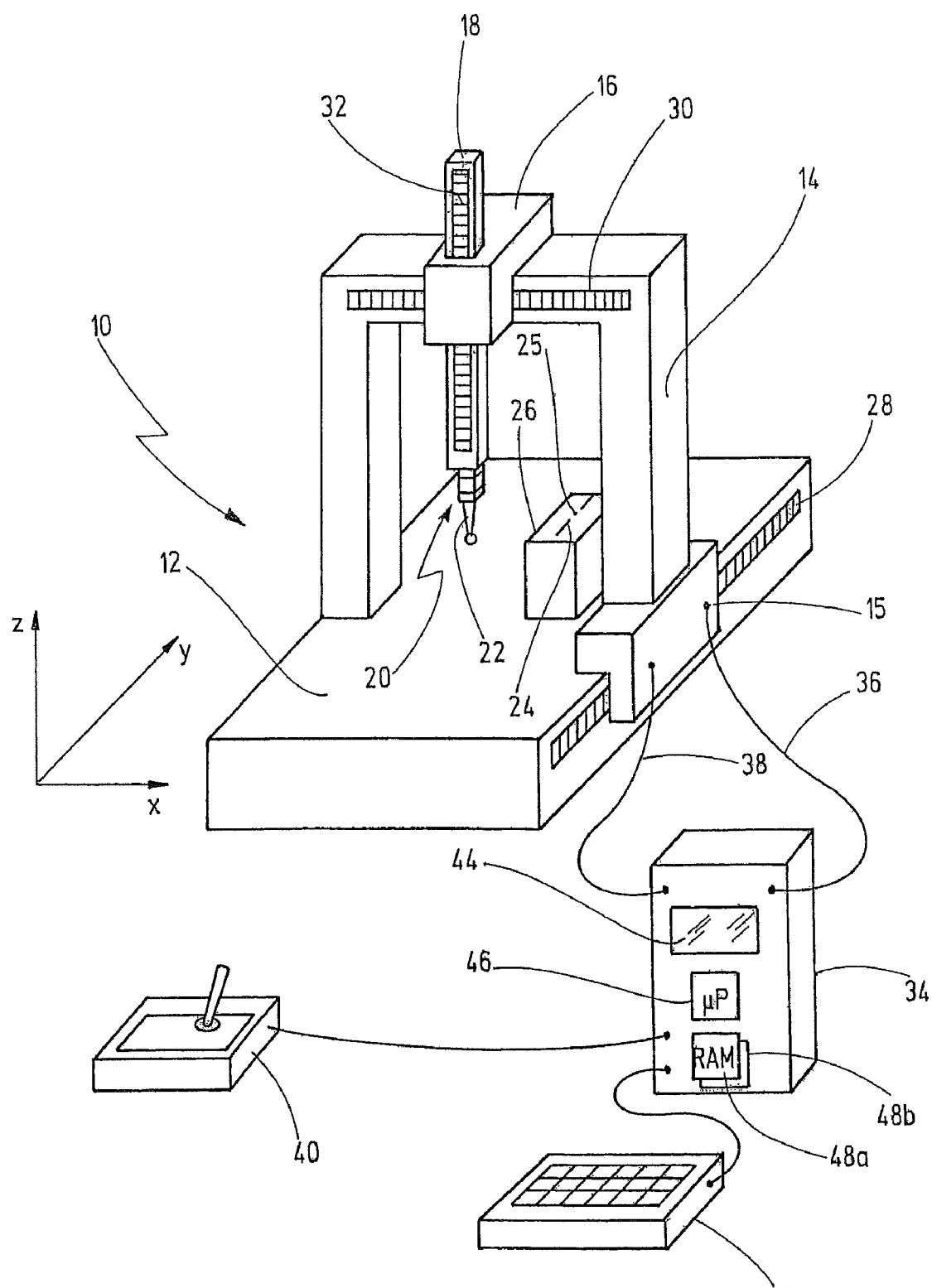
FIG. 1 shows a simplified illustration of a coordinate measuring machine according to an exemplary embodiment of the invention.

In FIG. 1, a coordinate measuring machine serving as an exemplary embodiment of a device according to the invention is denoted in an entirety by the reference numeral 10. The coordinate measuring machine 10 is illustrated here in gantry design, by way of example. However, the invention is not limited to a specific frame structure and can, for example, also be used in the case of coordinate measuring machines of horizontal arm design, and in the case of other machines. Moreover, the invention can also be used for coordinate measuring machines and machines in the case of which a workpiece is moved relative to a fixed head part because it is only the relative movement between the head part and the workpiece that is important in the context of the present invention.

The coordinate measuring machine 10 has a base 12 on which a gantry 14 with a drive 15 is arranged. The gantry 14 can be moved by means of the drive 15 along an axial direction that is usually denoted as y-axis.

Arranged on the upper transverse mount of the gantry 14 is a carriage that can be moved in x-direction. The carriage 16 carries a quill 18 that can be moved in z-direction. Located on the lower free end of the quill 18 is a probe head 20 with a stylus 22. On its free end, the stylus 22 has a contacting sphere 23 (FIG. 2) that serves to contact a surface point 24 on a workpiece 26. In order to explain the subsequent exemplary embodiments, it may be assumed that the surface point 24 is a measurement point within a contour 25 that runs on a surface of the workpiece or measurement object 26.

The reference numerals 28, 30, 32 denote linear scales that are arranged parallel to the axial directions of the coordinate measuring machine 10. By way of example, here these are glass scales that can be read off by means of suitable sensors (not illustrated here), in order to determine the moving positions of the gantry 14, the carriage 16 and the quill 18. By means of these measuring values, it is possible to determine the position of the probe head 20 in the measuring volume of the coordinate measuring machine 10. The spatial coordinate of a contacted surface point 24 can then be determined from the position of the probe head.

The reference numeral 34 denotes an evaluation and control unit that is connected via lines 36, 38 to the drives and sensors of the coordinate measuring machine 10. Furthermore, here the evaluation and control unit 34 is connected to a control console 40 and a keyboard 42. The control console 40 enables manual control of the coordinate measuring machine 10. The keyboard 42 enables the input of operating parameters, and the selection of measurement programs etc.

The control unit 34 has here a display 44 on which measurement results, parameter values, inter alia, can be outputted. Furthermore it has a processor 46 and a memory 48 that is illustrated with a plurality of memory areas 48a, 48b. The memory 48 is denoted here as RAM, but can also include a ROM, the ROM serving chiefly to store the so-called firmware of the coordinate measuring machine 10. In exemplary embodiments, the firmware includes program code (not illustrated here) that, inter alia, implements a control device such as is explained below by means of FIGS. 3 to 5 in various exemplary embodiments.

Figure 2:
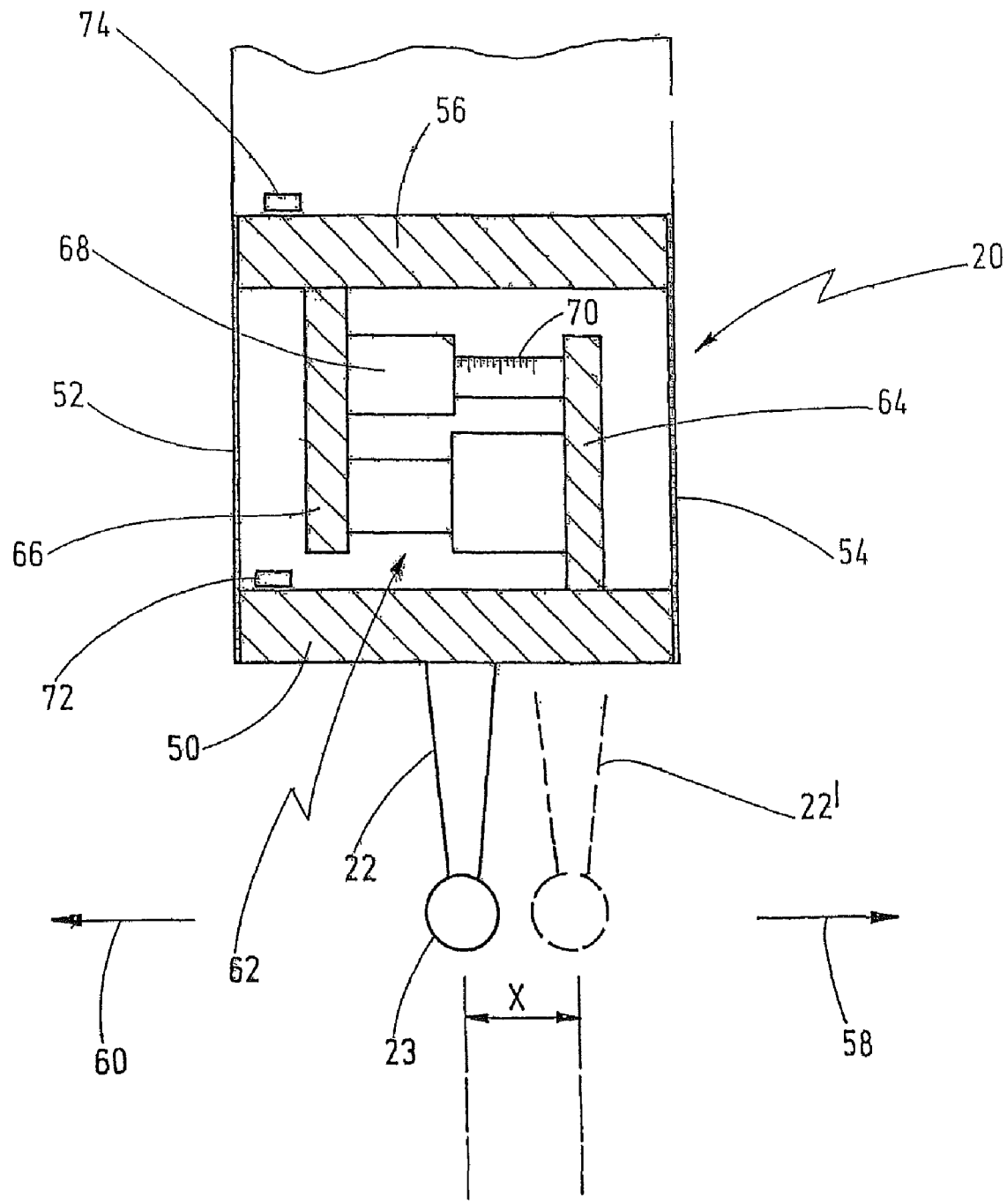
FIG. 2 shows a simplified illustration of a probe head from the coordinate measuring machine of FIG. 1.

FIG. 2 shows the probe head 20 of the coordinate measuring machine 10 with further details, although in a greatly simplified schematic representation.

The stylus 22 is fastened on a movable part 50 that is connected by two leaf springs 52, 54 to a probe head base 56. Owing to the leaf springs 52, 54, the movable part 50 can move with the stylus 22 relative to the probe head base 56, the two mutually opposite movement directions being indicated here by the arrows 58, 60. The movement directions of the stylus 22 are typically parallel to the movement directions x, y, z in which the probe head 20 can be moved.

Persons skilled in this field will see that the probe head 20 illustrated in FIG. 2 enables a deflection of the stylus 22 in only one axial direction 58, 60, and this is to be ascribed to the simplified illustration. Further leaf springs 52, 54 can be present for deflecting the stylus 22 in the two further axial directions, as is known from the relevant probe heads of the applicant.

The reference numeral 62 denotes an actuator by means of which the part 50 can be deflected relative to the probe head base 56. In the exemplary embodiment illustrated, the actuator 62 is, for example, a plunger coil that is arranged between two limbs 64, 66. The limb 64 is connected to the movable part 50, while the limb 66 is connected to the probe head base 56. The actuator 62 is capable of pressing the limbs 64, 66 apart, or pulling them together, the result being that the stylus 22 with the part 50 is deflected in the spatial direction 58 or in the spatial direction 60. Such a deflection produced by means of the actuator 62 serves, inter alia, to set a defined measuring or contact force, respectively. Moreover, within the scope of the present invention the actuator 62 is used for the purpose of reducing oscillations of the stylus 22 relative to the stationary probe head base 56, by setting a defined contact force against an instantaneous differential acceleration of the stylus 22 relative to the probe head base 56.

The reference numeral 68 denotes a sensor that is likewise arranged between the two limbs 64, 66. The sensor 68 is illustrated here with a scale 70 that enables a current deflection X of the stylus 22 (illustrated at the reference numeral 22') to be acquired by measurement technique. By way of example, the sensor 68 can be a plunge coil, a Hall sensor, an optical sensor or another position sensor or length sensor.

Here, the reference numerals 72 and 74 denote two acceleration sensors. The acceleration sensor 72 is arranged on the movable part 50 of the probe head that is connected to the stylus 22. The acceleration sensor 74 is seated on the stationary base 56 of the probe head 20. By means of the two acceleration sensors 72, 74 it is possible to determine a differential acceleration of the stylus 22 relative to the probe head base 56. Since this differential acceleration represents in the ideal case a signal that is in phase opposition to the oscillations of the stylus 22 about its rest position, the differential acceleration is suitable as a correction signal for suppressing these oscillations. However, some exemplary embodiments of the invention manage without such acceleration sensors 72, 74 and so the accelerating sensors 72, 74 are to be regarded here as optional.

Figure 3:
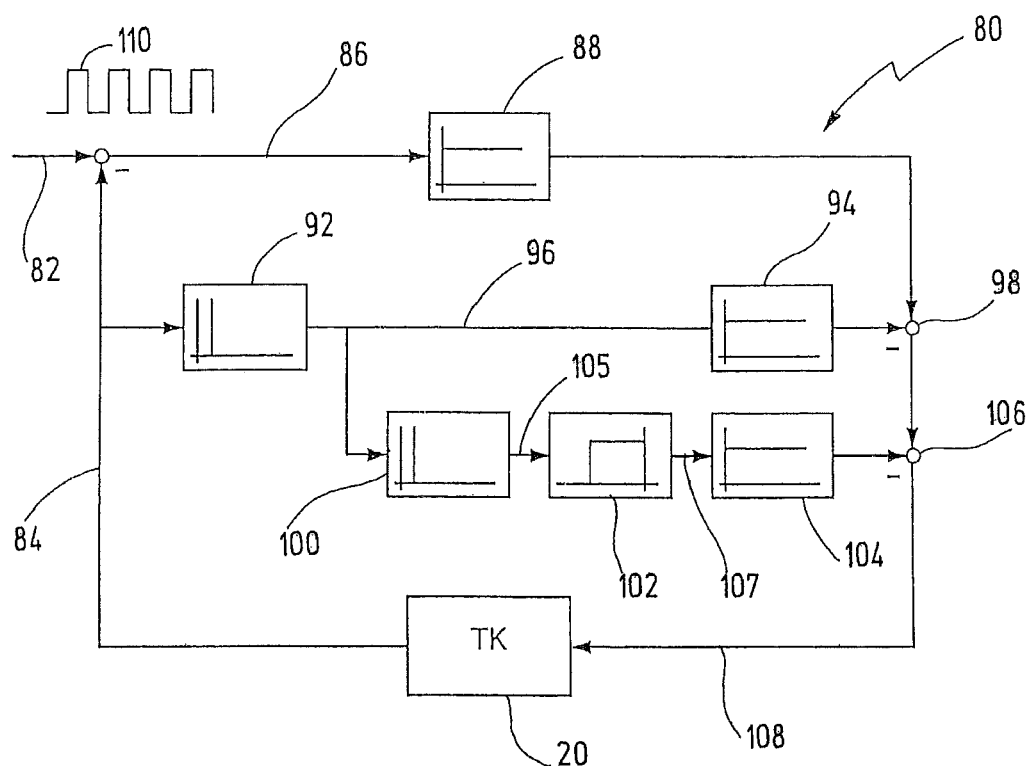
FIG. 3 shows a block diagram for a first exemplary embodiment of a control device that is used in the coordinate measuring machine of FIG. 1.

FIG. 3 shows one exemplary embodiment of a control device 80 by means of which a defined contact force of the stylus 22 is set. In exemplary embodiments, the defined contact force is set such that the contacting sphere 23 of the stylus is held continuously in contact with the contour 25 during movement of the probe head 20 along the contour 25.

The control device 80 receives as input variable a desired value 82 for the deflection of the stylus 22. An actual deflection 84 of the stylus is subtracted from the desired deflection 82. The difference yields the system deviation 86. During scanning of a contour 25 on a workpiece 26, the desired deflection 82 of the stylus 22 is advantageously set to zero. The actual deflection 84 can, for example, be determined by means of the position measuring device 68. The system deviation 86 is amplified via a P element 88.

In an exemplary embodiment, the actual deflection 84 of the stylus 22 is, moreover, fed to a D element 92, that is to say a differentiator. The output signal of the D element 92 is the deflection rate vACT of the stylus 22. It is denoted here by the reference numeral 96. The deflection rate vACT is amplified via a further P element 94 and subtracted from the amplified system deviation 86 at a summation point 98. This branch of the control device 80 forms the behavior of a fluid damper, since the preliminary deflection of the stylus 22 is the more strongly damped the higher the deflection rate vACT. Practical tests by the applicant have, however, shown that such a simulation of a fluid damper does not yield an optimum result in all instances. Consequently, in exemplary embodiments the control device 80 has a further branch with a further D element 100, an FIR filter 102 and a further P element 104 that are arranged in series with one another. On the input side, the further D element 100 receives the deflection rate 96 from the output of the D element 92. The further D element 100 supplies the deflection acceleration 105 of the stylus 22, and thus a signal that specifies a differential acceleration of the stylus 22 relative to the stationary probe head base 56. Since the oscillations of the stylus 22 are typically sinusoidal, the deflection acceleration is likewise sinusoidal, but shifted in phase by 180°. In a ideal case, the subtraction of the deflection acceleration 105 leads to an optimum damping of the oscillations.

However, there is the problem that existing interference signals (noise, external disturbances, inter alia) are disproportionately amplified by the twofold differentiation. In order to suppress these disturbances, use is made of the FIR filter 102, which in the present exemplary embodiment has a largely rectangular weighting. In other words, the FIR filter 102 forms a sliding average from the current acceleration value and past acceleration values. The disturbances are reduced by the averaging. The filtered acceleration signal 107 is amplified by means of the further P element 104 and subtracted at the summation point 106 from the amplified system deviation 86. This provides an actuating variable 108 by means of which the defined preliminary deflection of the stylus 22 is set. In exemplary embodiments, the actuating variable 108 is a control current by means of which the actuator 62 is actuated.

The reference numeral 110 denotes a clock signal which indicates that the closed control loop 80 is traversed periodically. In other words, with each stroke of the clock signal 110 a desired value/actual value comparison is carried out in order to determine the system deviation 86, and the manipulated variable for setting the contact force is determined by means of the elements 88 to 106.

Figure 4:
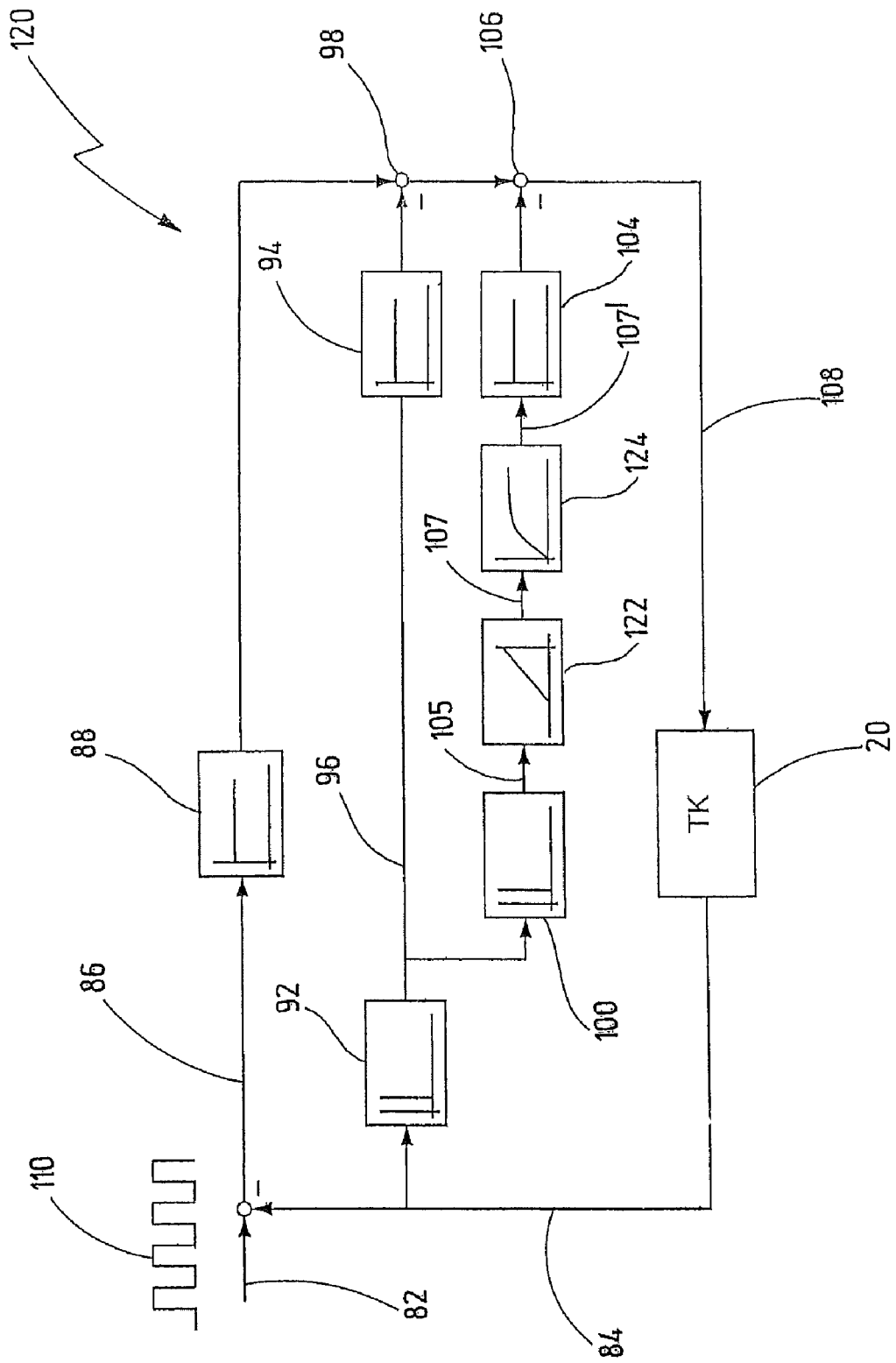
FIG. 4 shows a block diagram for a second exemplary embodiment of a control device for the coordinate measuring machine of FIG. 1.

FIG. 4 shows another exemplary embodiment for a control device that is used in the coordinate measuring machine 10 from FIG. 1. The basic design of the control device 120 corresponds to the control device 80 from FIG. 3. Identical reference symbols therefore denote identical elements in each case.

By contrast with the control device 80 from FIG. 3, the control device 120 has, however, an FIR filter 122 that has a largely triangular weighting. Past acceleration values are weighted less in the FIR filter 122 the further back they lie in the past. In other words, acceleration values lying further in the past feature less strongly in the weighted filter sum. By contrast with the FIR filter 102 with a largely rectangular weighting, such an FIR filter has the advantage that the phase shift of the filtered acceleration signal 107 is even less conspicuous than the unfiltered acceleration signal 105.

Moreover, the control device 120 has an additional IIR filter 124 that is arranged between the FIR filter 122 and the further P element 104. The IIR filter 124 is designed as a high-pass filter in order to suppress high-frequency disturbances even further. Such disturbances can be, in particular, the consequence of ground oscillations that are transmitted to the coordinate measuring machine 10. Such ground oscillations can, for example, already occur (if only to a slight extent) when someone passes the coordinate measuring machine 10 during the scanning measurement.

Figure 5:
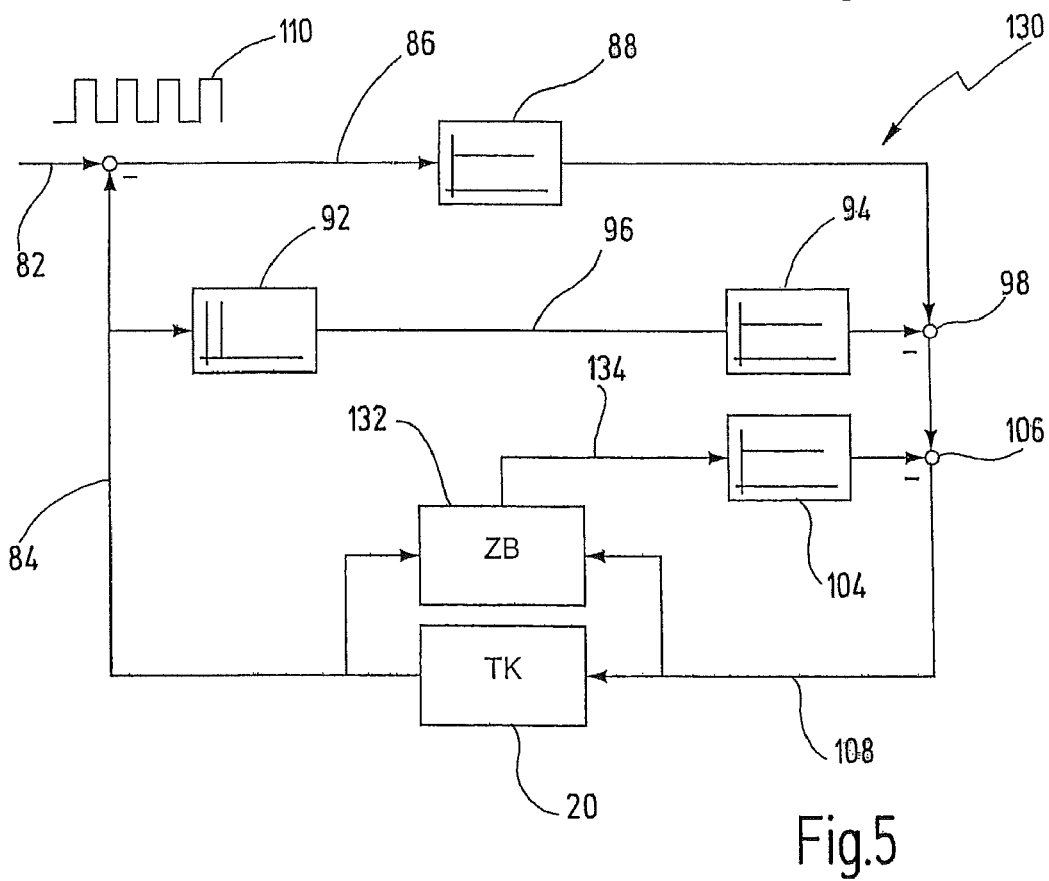
FIG. 5 shows a block diagram for a third exemplary embodiment of a control device for the coordinate measuring machine of FIG. 1.

FIG. 5 shows another embodiment for a control device 130 that can be applied in the coordinate measuring machine 10. In the case of the control device 130, the acceleration of the stylus 22 relative to the probe head 20 is determined not by twofold differentiation, but by means of a state observer 132. The state observer 132 is a model or a mathematical simulation of the probe head 20. The state observer 132 is fed both the actuating variable 108 for setting the defined preliminary deflection, and the actual deflection 84. The state observer 132 can model the system behavior of the probe head 20 by means of these input and output variables. The differential acceleration 134 can be determined in a known way from the modeled system behavior. The differential acceleration 134 is amplified again via a P element 104 and subtracted from the amplified system deviation 86.

Figure 6:
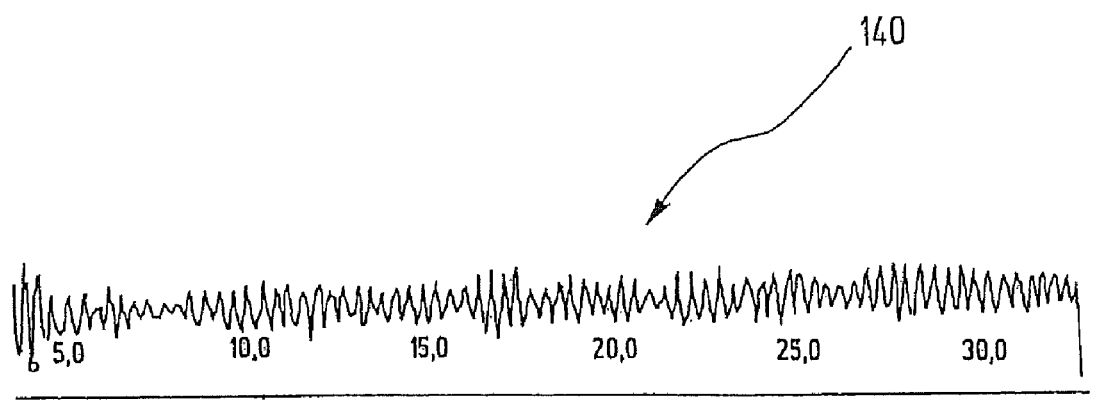
FIG. 6 shows a measuring curve that shows the deflections of the stylus in the case of the coordinate measuring machine of FIG. 1 during scanning of a horizontal contour, the new method not being used.

FIG. 6 shows a measurement profile 140 that was recorded without the new method. The measurement profile 140 exhibits the deflections of the stylus 22 relative to the probe head 20 during scanning of a horizontal contour 25 on a measurement object 26. The oscillations of the stylus 22 are clearly to be recognized.

Figure 7:
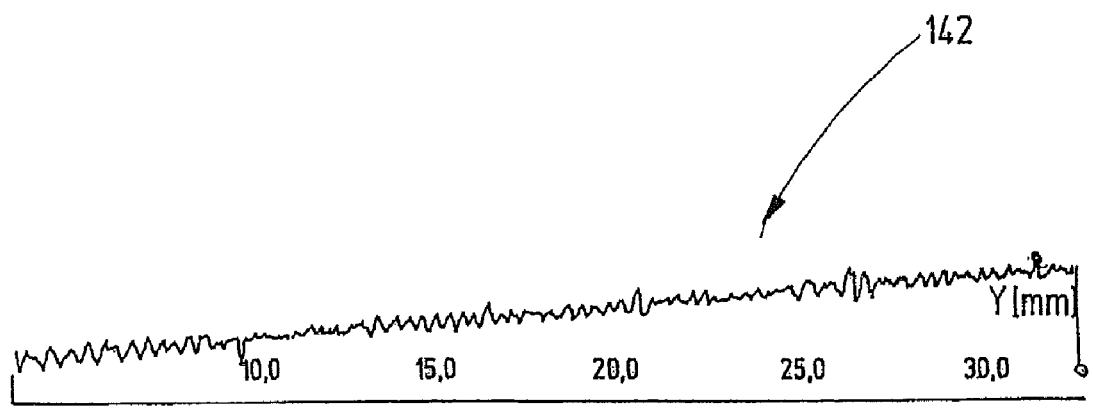
FIG. 7 shows a measuring curve similar to that of FIG. 6, but with application of the new method.

FIG. 7 shows a comparable measurement profile 142 that was, however, recorded by means of the new method. As may be seen, the oscillations of the stylus 22 are clearly reduced. (For the sake of completeness, it may be noted that here the measurement profile 142 seems to include a linearly rising component. However, this component is not actually present. The linear rise is to be ascribed to the possibilities of representation in the measurement setup used.)

What is claimed is:

1. A method for determining spatial coordinates at a multiplicity of measurement points along a contour of a measurement object, the method comprising the steps of:
    providing a probe head comprising a probe element movably supported on the probe head and comprising an actuator capable of setting a preliminary deflection of the probe element relative to the probe head;
    moving the probe head relative to the measurement object in a measuring volume;
    contacting a first measurement point on the contour with the probe element;
    recording first position values and first deflections, the first position values being representative of the position of the probe head in the measuring volume, and the first deflections being representative of the position of the probe element relative to the probe head;
    moving the probe head along the contour and recording further position values and further deflections at the multiplicity of measurement points along the contour; and
    determining the spatial coordinates as a function of the further position values and the further deflections;
    wherein the probe element is held in contact with the contour during the step of moving by producing a defined contact force by means of the actuator; and
    wherein the defined contact force is determined as a function of a differential acceleration of the probe element relative to the probe head and, furthermore, as a function of a differential speed of the probe element relative to the probe head.

2. The method of claim 1, wherein the differential acceleration is determined by means of at least one acceleration sensor.

3. The method of claim 1, wherein the differential acceleration is estimated by means of at least one state observer.

4. The method of claim 1, wherein the differential acceleration is determined by twofold differentiation of the further deflections.

5. The method of claim 1, wherein the contact force is periodically determined as a function of the differential acceleration.

6. The method of claim 1, wherein the differential acceleration is filtered in order to obtain a filtered differential acceleration, and wherein the contact force is determined as a function of the filtered differential acceleration.

7. The method of claim 6, wherein the differential acceleration is filtered using a non-recursive filter in order to obtain the filtered differential acceleration.

8. The method of claim 7, wherein the non-recursive filter has a largely rectangular weighting.

9. The method of claim 7, wherein the non-recursive filter has a largely triangular weighting.

10. The method of claim 7, wherein the differential acceleration is further filtered using a recursive highpass filter in order to obtain the filtered differential acceleration.

11. An apparatus for determining spatial coordinates at a multiplicity of measurement points along a contour of a measurement object, the apparatus comprising:
    a probe head comprising a probe head base, a probe element movably supported relative to the probe head base, and an actuator capable of setting a preliminary deflection of the probe element relative to the probe head base, the probe head being movable relative to the measurement object in a measuring volume;
    first position measuring devices for determining position values that are representative of the position of the probe head in the measuring volume;
    second position measuring devices for determining deflections that are representative of the position of the probe element relative to the probe head base;
    an evaluation and control unit for determining the spatial coordinates as a function of the position values and the deflections; and
    a control device configured to hold the probe element in contact with the contour during movement of the probe head by producing a defined contact force by means of the actuator;
    wherein the control device is designed to determine the defined contact force as a function of a differential acceleration of the probe element relative to the probe head base and, furthermore, as a function of a differential speed of the probe element relative to the probe head base.

12. A method for determining spatial coordinates of a multiplicity of measurement points in a measurement volume, the method comprising the steps of:
    providing a probe head comprising a probe element movably supported on the probe head and an actuator capable of producing a defined contact force when the probe element makes contact with the measurement object;
    contacting a first measurement point on the measurement object with the probe element;
    moving the probe head along a contour on the measurement object;
    recording position values and deflections, with the position values being representative of the positions of the probe head within the measuring volume, and with the deflections being representative of the positions of the probe element relative to the probe head; and
    determining the spatial coordinates as a function of the position values and the deflections;
    wherein the probe element is held in contact with the measurement object along the contour during the step of moving by producing the defined contact force by means of the actuator; and
    wherein the defined contact force is determined as a function of a differential acceleration of the probe element relative to the probe head.

13. The method of claim 12, wherein the contact force is further determined as a function of a deflection speed of the probe element relative to the probe head.

14. The method of claim 12, wherein the deflections are differentiated twice in order to determine the differential acceleration.

15. The method of claim 12, wherein the differential acceleration is filtered in order to obtain a filtered differential acceleration, with the contact force being determined as a function of the filtered differential acceleration.

16. The method of claim 15, wherein the differential acceleration is filtered using a non-recursive filter in order to obtain the filtered differential acceleration.

17. The method of claim 16, wherein the differential acceleration is further filtered using a recursive highpass filter in order to obtain the filtered differential acceleration.

18. A computer program product comprising a storage medium where a program code is stored, the storage medium being designed to interact with an apparatus for determining spatial coordinates along a contour of a measurement object, the apparatus comprising a probe head having a probe head base, a probe element movably supported relative to the probe head base, and an actuator capable of setting a preliminary deflection of the probe element relative to the probe head base, the probe head being movable relative to the measurement object in a measuring volume, the apparatus also comprising first position measuring devices for determining position values that are representative of the position of the probe head in the measuring volume, second position measuring devices for determining deflections that are representative of the position of the probe element relative to the probe head base, an evaluation and control unit for determining the spatial coordinates as a function of the position values and the deflections, and a control device configured to hold the probe element in contact with the contour during movement of the probe head by producing a defined contact force by means of the actuator, with the program code being designed to control the control device such that the defined contact force is determined as a function of a differential acceleration of the probe element relative to the probe head.

* * * * *